US010380361B2

(12) United States Patent
Leleu

(10) Patent No.: US 10,380,361 B2
(45) Date of Patent: *Aug. 13, 2019

(54) SECURE TRANSACTION METHOD FROM A NON-SECURE TERMINAL

(71) Applicant: SKEYECODE, Paris (FR)

(72) Inventor: Jean-Luc Leleu, Paris (FR)

(73) Assignee: SKEYECODE, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,816

(22) Filed: Aug. 24, 2017

(65) Prior Publication Data

US 2017/0372083 A1 Dec. 28, 2017

Related U.S. Application Data

(63) Continuation of application No. 14/959,776, filed on Dec. 4, 2015, now Pat. No. 9,760,721, which is a (Continued)

(30) Foreign Application Priority Data

Feb. 11, 2011 (FR) ..................... 11 00422

(51) Int. Cl.
*H04L 29/06* (2006.01)
*G06F 21/60* (2013.01)
(Continued)

(52) U.S. Cl.
CPC ............ *G06F 21/606* (2013.01); *G06F 21/31* (2013.01); *G06F 21/36* (2013.01); *G06F 21/71* (2013.01);
(Continued)

(58) Field of Classification Search
CPC ...................................................... G06F 21/84
See application file for complete search history.

(56) References Cited

U.S. PATENT DOCUMENTS 8,448,226 B2 * 5/2013 Narasimhan ............ G06F 21/36
382/100
2001/0042051 A1 11/2001 Barrett et al.
(Continued)

FOREIGN PATENT DOCUMENTS

EP 1821201 A2 8/2007
EP 2023333 A2 2/2009
WO 03/067797 A1 8/2003

OTHER PUBLICATIONS

Menezes et al.; "Handbook of Applied Cryptography;" Jan. 1997; pp. 397-399.
(Continued)

*Primary Examiner* — Jason K Gee
(74) *Attorney, Agent, or Firm* — Oliff PLC

(57) ABSTRACT

The invention relates to a transaction method, the method including the steps of: providing a terminal including a main processor, a graphic processor controlling a display, and a control member, the graphic processor including a memory bank which cannot be accessed from the outside; creating a link between the graphic processor and a secure processor, the link being secured by means of an encryption key shared only by the graphic processor and the secure processor; presenting first data to the user; collecting second data from commands entered by the user by means of the control member, in connection with the first data; transmitting the second data to the secure processor; and, if the user has been authenticated from the second data, carrying out the transaction, the secure link being used to transmit the first and/or second data, and/or to carry out the transaction.

26 Claims, 8 Drawing Sheets

Related U.S. Application Data continuation of application No. 13/984,919, filed as application No. PCT/FR2012/050294 on Feb. 10, 2012, now Pat. No. 9,223,994.

(51) Int. Cl.
*G06F 21/36* (2013.01)
*G06F 21/71* (2013.01)
*G06F 21/84* (2013.01)
*G06F 21/31* (2013.01)

(52) U.S. Cl.
CPC ...... *G06F 21/84* (2013.01); *G06F 2221/2103* (2013.01)

(56) References Cited

U.S. PATENT DOCUMENTS

| | | |
|---|---|---|
| 2003/0108198 A1 | 6/2003 | Lahiri |
| 2003/0140241 A1 | 7/2003 | England et al. |
| 2005/0021469 A1 | 1/2005 | Han |
| 2005/0235154 A1 | 10/2005 | Serret-Avila |
| 2006/0129485 A1 | 6/2006 | Hamzy et al. |
| 2006/0177060 A1* | 8/2006 | Johnson ............ G09C 5/00 380/255 |
| 2007/0198412 A1 | 8/2007 | Juffa |
| 2009/0041380 A1* | 2/2009 | Watanabe .......... G06F 21/84 382/276 |
| 2011/0161667 A1 | 6/2011 | Poornachandran et al. |

OTHER PUBLICATIONS

Menezes et al.; "Handbook of Applied Cryptography;" Oct. 1996; pp. 385-387; 497-500.

May 8, 2012 International Search Report issued in International Patent Application No. PCT/FR2012/050294.

Translation of May 8, 2012 Written Opinion issued in International Patent Application No. PCT/FR2012/050294.

* cited by examiner

SECURE TRANSACTION METHOD FROM A NON-SECURE TERMINAL

This is a Continuation of application Ser. No. 14/959,776 flied Dec. 4, 2015, which in turn is a Continuation of application Ser. No. 13/984,919 filed Oct. 15, 2013, which in turn is a National Phase of International Patent Application No. PCT/FR20121050294 filed Feb. 10, 2012, which claims priority to French Patent Application No. 11 00422 filed Feb. 11, 2011. The disclosures of the prior applications are hereby incorporated by reference herein in their entireties.

The present invention relates to a method for executing a secure transaction between a mobile terminal and a remote server.

Mobile terminals called "smartphones" have recently emerged, these smartphones being equipped with means for connecting to a data transmission network such as the Internet, with a main processor, and with a display screen controlled by a graphics processing unit (GPU). Such a terminal also comprises an interfacing means that may take the form of a keypad that is separate from the display screen, or of a touch-sensitive surface associated with the latter.

In parallel, e-commerce has experienced fast growth. In this context, it would be desirable to execute e-commerce transactions from mobile terminals, but this notably raises security problems. This is because it is possible to install what is called "malicious software" or "malware" on a smartphone, and to have the main processor of the terminal execute this malware, the malware having access to all the memory accessible by the main processor. Such software may be configured to spy on any transactions executed by the terminal and to recover any secret data manipulated during these transactions for transmission over the network.

To ensure the security of such transactions, it has already been proposed to use a secure processor, such as the processor of a SIM (subscriber identification module) card with which cell phones are generally equipped, as a secure element for cryptographic computations. In order to be able to execute one or more payment applications, the secure processor must be able to store as many secret cryptographic keys as there are payment applications. However, loading an application into the memory of a secure processor is a complex operation that needs to be highly secure. Specifically, it involves external parties such as TSMs (trusted service managers). Since SIM cards are issued by cell phone operators, the latter may refuse to have such applications installed in the card. Furthermore, in the event of theft, or during maintenance of the telephone, the processor of the SIM card may be hacked by a hacker seeking to discover the secret keys stored in its memory.

Accessing the secure functions installed in the processor of a SIM card generally entails inputting a secret code (PIN code) by means of the interfacing means connected to the main processor of the terminal. Thus a secret code input by the user necessarily passes through the main processor. Malware executed by the main processor can therefore access this secret code.

Moreover, it has already been proposed to use the computational power of graphics processors installed in computers to perform cryptographic computations. Specifically, such processors have a parallel computing architecture that is suitable for carrying out certain cryptographic computations such as symmetrical or asymmetrical encryption and decryption computations. However, graphics processors generally lack a nonvolatile memory. Hence any application or secret key stored in its memory will disappear each time the computer is turned off. Problems with storage of the secret data required to execute secure transactions result.

Furthermore, graphics processors cannot communicate directly with an external server. All the data of a transaction must therefore be relayed via the main processor of the computer managing the communication circuits of the computer. As a result, a malicious program installed on the computer can recover and store all the transaction data exchanged between the graphics processor and the server. Even if the transaction data are encrypted before being transmitted, the malware can reuse the encrypted transaction data to execute a transaction identical to that corresponding to the stored data.

It would therefore be desirable to protect secret data, or more generally sensitive data such as transaction data, during transit in a terminal comprising a graphics processor, or when they are transmitted between such a terminal and a server.

Some embodiments of the invention relate to a method for executing a transaction, which method comprises steps consisting in: providing a terminal comprising a main processor, a graphics processor controlling a display screen, and an interfacing means, the graphics processor comprising a memory that is inaccessible from outside the graphics processor; establishing a link between the graphics processor and a secure processor, via the main processor, the link being secured by means of an encryption key shared only by the graphics processor and the secure processor, and inaccessible from outside the graphics processor and the secure processor; presenting first data to the user; gathering second data from commands entered by the user by means of the interfacing means, the second data relating to the first data; transmitting the second data to the secure processor; authenticating the user on the basis of the second data; and if the user has been authenticated, executing the transaction, the secure link being used to transmit the first data, and/or to transmit the second data, and/or to execute the transaction.

In one embodiment, the first data comprise a sequence of images displayed on the display screen by the graphics processor, each image of the sequence being broken down into a plurality of complementary frames that are not individually intelligible to a user, the complementary frames being generated by a visual cryptography algorithm and displayed in succession so that the corresponding image appears on the display screen in a manner that is intelligible to the user.

In another embodiment, the first data comprise an image, or a plurality of images displayed in succession on the display screen by the graphics processor, each displayed image being intelligible only in the presence of an image formed on a semi-transparent label positioned on the display screen in such a way as to be superposed on the displayed image, the image formed on the label and the image, or some of the images, displayed being generated by a visual cryptography algorithm from an intelligible image to be presented to the user.

In another embodiment, the first data are transmitted by the secure processor to the graphics processor via the secure link, or else are generated by the graphics processor.

In another embodiment, the secure processor is integrated into a card installed in the terminal, or into a remote server connected to the terminal via a data transmission network.

In another embodiment, the second data are commands entered by the user by means of the interfacing means if the first data are not directly accessible, or else are generated from these commands depending on the first data and transmitted to the secure processor via the secure link.

In another embodiment, the secure link is established, without using an asymmetrical encryption algorithm, from a secret data item shared by the graphics processor and the secure processor.

In another embodiment, the method comprises steps of authenticating the user by means of a secret code and of using the secret code to generate a key shared only by the graphics processor and the secure processor, the shared key being used to establish the secure link between the graphics processor and the secure processor.

In another embodiment, the method comprises steps of: generating, using the graphics processor or the secure processor, a series of sequence numbers comprising a first sequence number, the subsequent sequence numbers each being obtained by applying a hash function to a preceding sequence number in the series of sequence numbers; inserting, into each message sent via the secure link, a selected sequence number located, in the series of sequence numbers, before a sequence number transmitted beforehand via the secure link; and comparing the result of the hash function applied to a sequence number received via the secure link with a sequence number received beforehand via the secure link.

In another embodiment, the method comprises steps consisting in: gathering payment data and encrypting the payment data using the encryption key used to secure the link between the graphics processor and the secure processor; storing the encryption key in the secure processor, and storing the encrypted payment data in the main processor: during a payment transaction, establishing a secure link between the graphics processor and an e-commerce server, and a secure fink between the graphics processor and the secure processor; authenticating the user in the secure processor and transmitting, via the secure link with the secure processor, the encryption key of the payment data; the graphics processor receiving the encryption key of the payment data and the encrypted payment data, and decrypting the payment data; and in transmitting the payment data via the secure link with the e-commerce server.

In another embodiment, the gathering of the payment data comprises steps consisting in: taking a photograph of a payment card and extracting the payment data from the photograph; or else in the graphics processor presenting first data to the user, gathering data relating to the first data from commands entered by the user by means of the interfacing means, transmitting the gathered data to the graphics processor and converting, by way of the graphics processor, the gathered data into payment data using the first data.

In another embodiment, the payment data are in a standard format that is comprehensible to the e-commerce server, or are transmitted to a gateway server that transmits the payment data to the e-commerce server in a format expected by the latter.

In another embodiment, the method comprises steps of loading a program into a memory of the graphics processor, of executing the program in the graphics processor, of calculating a signature for the contents of the memory of the graphics processor taking account of a secret code entered by the user and known by the secure processor, of transmitting the signature to the secure processor, and of verifying that the signature received by the secure processor corresponds to a stored signature modified to take account of the secret code known by the secure processor.

Other embodiments of the invention relate to a terminal comprising a main processor, a graphics processor controlling a display screen, and an interfacing means, the graphics processor comprising a memory that is inaccessible from outside the graphics processor. The terminal is configured to implement the method defined above.

In one embodiment, the interfacing means comprises a transparent touch-sensitive surface placed on the display screen, or comprises a keypad.

In another embodiment, the secure processor belongs to a remote server connected to the terminal via a communication network, or else is integrated into a card and connected to the main processor of the terminal.

Embodiments of the invention will be described below, by way of nonlimiting example, with regard to the appended figures, in which:

FIG. 1 schematically shows a conventional terminal in communication with a transaction server;

FIG. 2 schematically shows a conventional graphics processor;

The terminal MT is equipped with circuits for connecting it to a network such as the Internet. The terminal MT is, for example, a cell phone, especially a smartphone or PDA (personal digital assistant), or any other type of device such as a personal computer equipped with circuits for connecting it to a network such as the Internet. The terminal MT also comprises a main processor HP; circuits NIT for connecting the terminal MT to a network NT, which circuits NIT are connected to the processor HP; a display screen DSP; a graphics processor GP ensuring the management of the screen DSP and connected to the processor HP; and an interfacing means CM connected to the processor HP. The interfacing means may comprise a keypad or a touch-sensitive surface, for example a transparent touch-sensitive surface placed on the screen DSP, and, possibly, a pointing device such as a mouse. The processor HP may be the main (or "baseband") processor of the terminal.

The terminal may also comprise a secure processor SE, which may be integrated into a UICC (universal integrated circuit card). The processor SE may, for example, be a SIM (subscriber identity module) card or a mini-SIM or micro-SIM card allowing access to a cell phone network. The secure processor may comprise an NFC (near field communication) circuit in order to allow it to communicate with a contactless terminal. The NFC circuit may be integrated into a SIM card (NFC-SIM) or UICC, or into a SoC (system on chip) circuit or into an external memory card, for example an SD card. The circuits NIT may comprise radio communication circuits providing access to a cell phone network, and to the Internet via the cell phone network, and/or a circuit for connecting to a wireless network (WiFi, Bluetooth), and/or any other wired or wireless means for connecting to a data transmission network such as the Internet.

The server SRV is configured to provide transaction services to users. It may comprise a security device, a program for managing transaction services, and a memory area dedicated to the storage of programs and transaction data. The security device protects the server, and especially access to the memory area dedicated to the transaction data and to the program for managing the transaction services.

In the following, the term "transaction" generally refers to a user accessing a service or data via a link, this access requiring user authentication.

Figure 1:
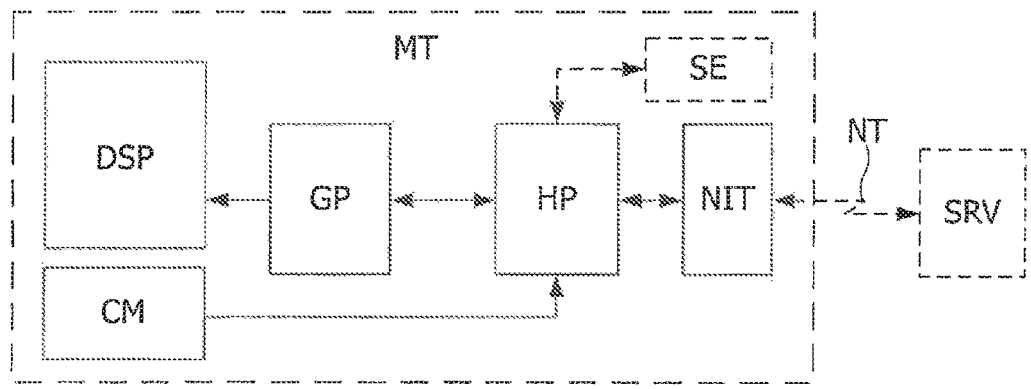
FIG. 1 shows a conventional terminal MT, capable of communicating with a server SRV via a data transmission network such as the Internet. The server SRV may be configured to carry out transactions with terminals to which it can be connected.
Figure 2:
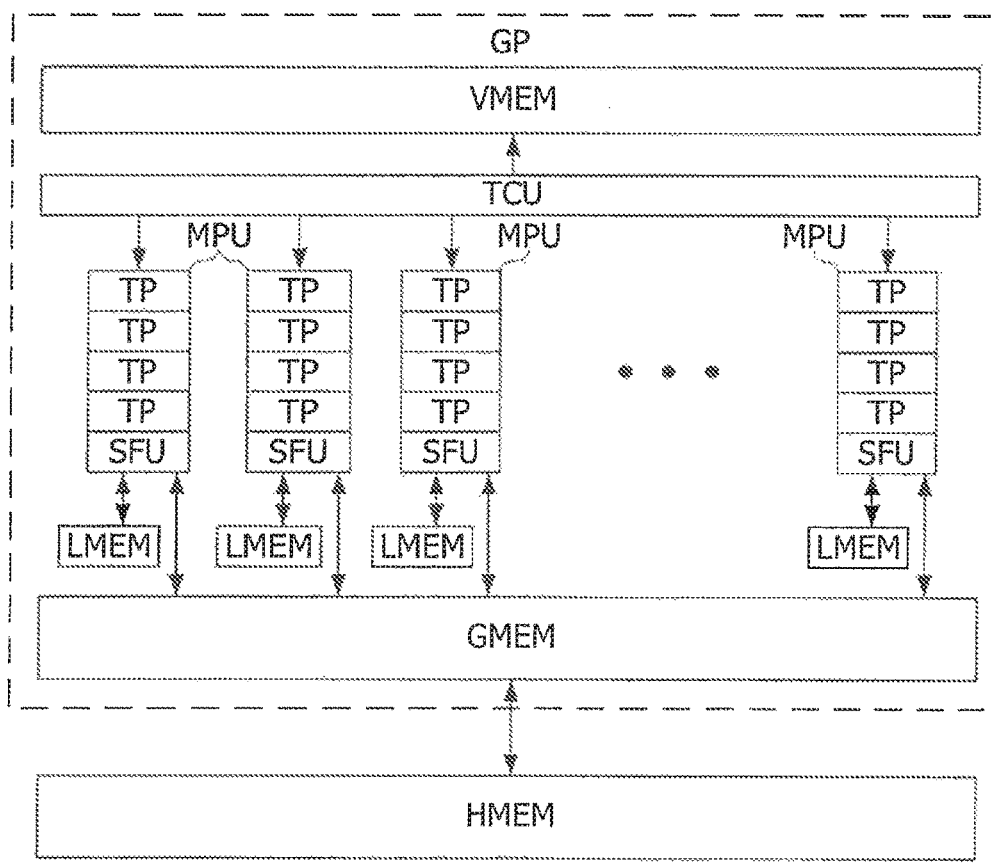

FIG. 2 shows an example graphics processor GP. In FIG. 2, the processor GP has a parallel architecture comprising a plurality of multiple processing units MPU. Each processing unit MPU comprises a plurality of thread processors TP and a special function unit SFU. The units SFU are configured to execute infrequent operations that are costly in terms of computational resources, such as divisions, square roots, etc. The processors TP of a given unit MPU can communicate with one another via a local memory LMEM specific to the unit MPU. In contrast, processors TP belonging to different units MPU cannot communicate with one another or synchronize. The processors TP of a unit MPU do not therefore have access to the local memories LMEM of the other units MPU of the processor GP.

The units MPU are managed by a thread execution control unit TPU. The processor GP also comprises a video memory VMEM and a main memory GMEM that is not directly accessible from outside the processor GP. Reciprocally, the memory HMEM of the processor HP is not directly accessible by the processor P. However, data transfers between the memories GMEM and HMEM are possible via an input/output pod of the processor GP if a DMA (direct memory access) protocol is used.

Figure 3:
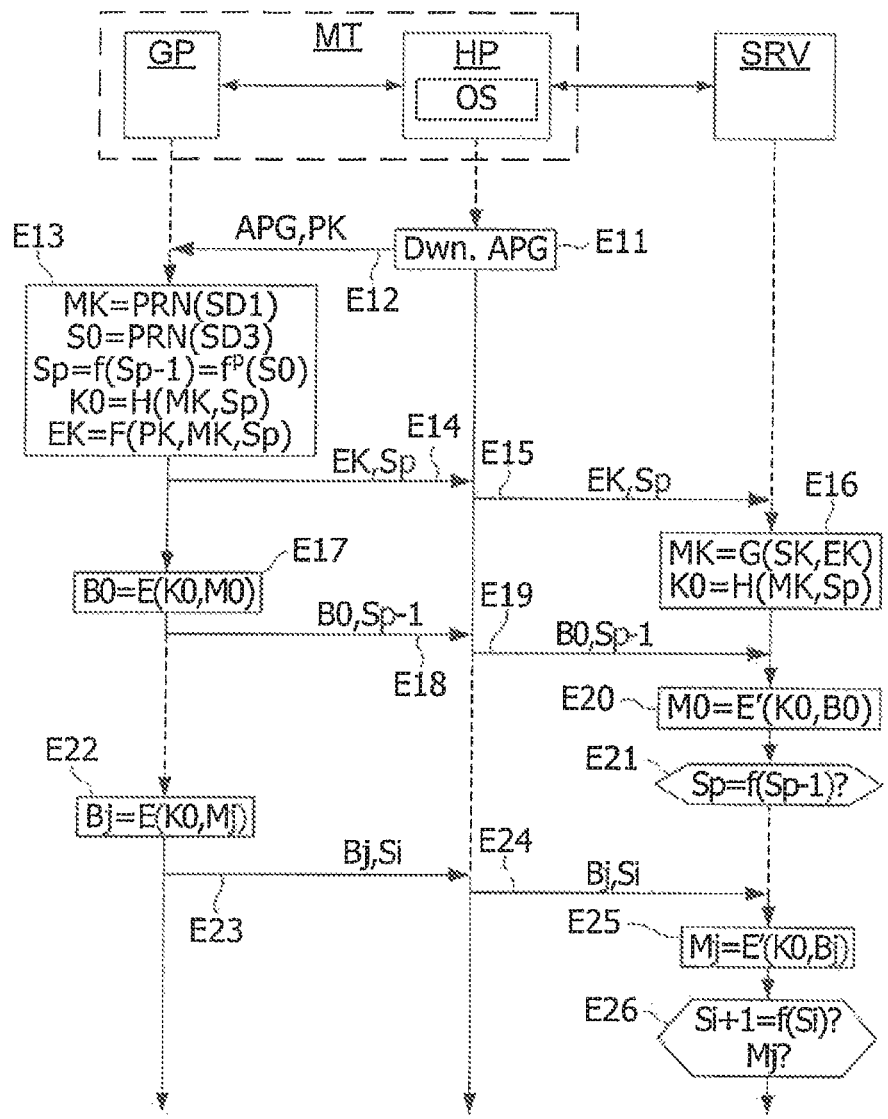
FIGS. 3 to 5 show sequences of steps executed by the terminal and the server, in different embodiments.

FIG. 3 shows a sequence of steps executed after a specific transaction managing program has been initiated in the processor HP of the terminal MT. This sequence comprises transfer of data between the processors HP and GP, performed via the memories GMEM and HMEM.

Execution of the transaction managing program by the processor HP comprises steps E11 to E26. In step E11, the processor HP loads a program APG into the memory HMEM. In the next step E12, the program APG is transferred from the memory HMEM to the memory GMEM of the processor P. During this step, a public key PK of the server SRV is also transferred to the memory GMEM. The program APG comprises a function PRN for generating random numbers; an asymmetrical encryption function F, for example a 2048 bit RSA algorithm; a symmetrical encryption function E, for example a 256 bit AES algorithm (AES-256) or AES-512; and hash functions f and H, for example SHA-1, SHA-256, SHA-224, SHA-384 or SHA-512.

In the next step E13, the processor GP executes the program APO, which comprises operations for applying the function PRN to what is called a "seed" number SD1, to obtain a number MK. The number MK is subsequently used as a secret "master" key and stored in/confined to a memory area of the processor GP that is inaccessible from outside the latter. The key MK is stored in a local memory LMEM and used by the processor GP until the memory LMEM, which is volatile, is wiped, especially when the processor GP is turned off. A session key K0 is also computed by applying a hash function H to the key MK and to a number Sp that may be randomly generated. Next, the processor GP uses the asymmetrical encryption function F and the key PK that it received in step E12 to encrypt the key MK and the number Sp. In step E14, the encrypted data EK thus obtained is transmitted to the processor HP, then retransmitted by the processor HP to the server SRV in the step E15. In the step E16, the server SRV receives the encrypted data item EK and decrypts it by using a private key SK that corresponds to the public key PK and that it alone knows. This decrypting operation allows the server SRV to obtain the master key MK and the number Sp. Since it knows the function H, the server SRV can then generate the session key K0 that will be used by the terminal MT by applying the function H to the key MK and to the number Sp. Thus, the master key MK, the session key K0 and the number Sp are only known by the processor GP and the server SRV. The session key K0 may therefore be used by the processor GP and the server SRV as a secret key for a symmetrical encryption algorithm used to encrypt exchanged messages, and thus to secure these exchanges. The session key K0 is intended to be used for just one transaction. If a new transaction has to be performed before the memory of the processor GP is wiped, a new session key may be generated from the master key MK known only by the processor GP and server SRV.

In the step E17 following step E14, the processor GP generates a message M0. Each message Mj exchanged between the processor and the server SRV comprises a header and a message body. The header of the messages may comprise one or more state variables indicating, for example, a current transaction state, a counter value, geolocation information, time/date information, an IP address, a MAC address, and control values to be executed by the recipient of the message. The header information may be used to compare the received message with a message received beforehand in a given transaction or with an authenticated user. The header information may also be used to verify consistency via comparison with corresponding values received beforehand. The message body may be absent or comprise information and/or controls to be transmitted between the processor GP and the server SRV. In step E17, the message M0 is encrypted by the symmetric encryption function E using the session key K0.

In step E18, the encrypted message B0=E(K0, M0) is transmitted by the processor GP to the processor HP. In step E19, the processor HP retransmits the encrypted message B0 to the server SRV. In step E20, the server SRV receives the encrypted message B0 and decrypts it using a cryptographic function E' and the key K0, in order to obtain the message M0. The functions E and E' may be identical or different.

The following steps E22 to E26 may be executed periodically or each time data are transmitted between the processor GP and the server SRV. In step E22, the processor GP generates a message Mj to be transmitted to the server SRV, and encrypts the message M using the encryption function E and the session key K0 in order to obtain an encrypted message Bj=E(K0,Mj). In step E23, the processor GP transmits the encrypted message Bj to the processor HP. In step E24, the processor HP receives the encrypted message Bj and retransmits it to the server SRV. In step E25, the server SRV receives the encrypted message Bj and decrypts it using the function E' and the key K0. In the following step E26, the server SRV verifies the contents of the message Mj thus obtained. This verification operation may consist in verifying that the data in the header of the message Mj is consistent with header data from a message Mj−1 received beforehand, and optionally in verifying the body data of the message Mj. If this verification operation succeeds, the server SRV assumes that it is still in communication with the terminal MT. In contrast, if this verification operation fails, the server SRV assumes that the security of the link with the terminal MT has been compromised and terminates the transaction in progress.

It will be noted that steps E22 to E26 may also, or alternatively, be initiated by the server SRV, i.e. the server executes steps E22, E23 and the processor GP the steps E25, E26, the processor HP again functioning as a relay between the server SRV and the processor GP. Thus, steps E22 to E26 may be initiated by either the processor GP or the server SRV, whenever one needs to transmit data to the other.

Figure 4:
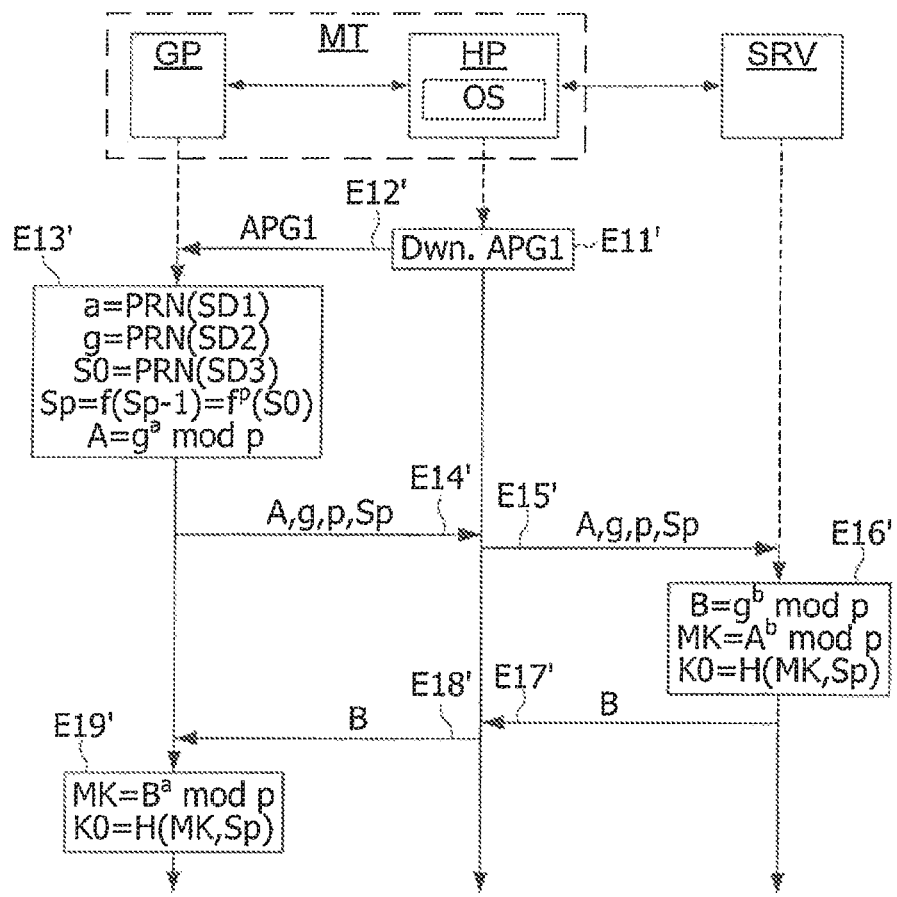

The master key MK may be generated in another way, for example using a Diffie-Hellman algorithm. Thus, FIG. 4 shows steps E11' to E19' executed by the processors GP, HP and the server SRV, replacing steps E11 to E16 in FIG. 3. In step E11', the processor HP loads a program APG1 into the memory HMEM of the processor HP. In the following step E12', the program APG1 is transferred from the memory HMEM of the processor EP. During this step, the public key PK of the server SRV is also transferred to the memory GMEM. The program APG1 comprises the functions PRN, F, E, f, H, and a modular exponentiation function.

In the following step E13', the processor GP executes the program APG1, this involving operations for applying the random number generating function to seed values SD1, SD2, in order to obtain numbers a, g. The numbers a and g are used by the processor GP to generate a master key. The processor GP then carries out a modular exponentiation calculation by raising the number g to the power a modulo p. The number p is for example delivered by the program APG1. The processor GP also applies the asymmetric encryption function F, using the key PK that it received in step E12', to encrypt a number Sp that may be randomly generated.

The numbers g and p, the result A of the modular exponentiation calculation, and the result EK of the encryption, are transmitted to the processor HP in step E14', then retransmitted by the processor HP to the server SRV in step E15'. In step E16', the server SRV receives these data and calculates a number B by applying, to the number g, a modular exponentiation calculation modulo p to a power b that is, for example, randomly generated. The number b also allows the server SRV to calculate a secret data item by raising the number A received to the power b modulo p. This secret data item is shared with the processor GP, and may therefore subsequently be used as a master key MK. The server SRV decrypts the encrypted data EK using a private key SK, known by it alone, corresponding to the public key PK. This decryption operation provides the server SRV with the Sp. The server SRV then defines a session key K0 by applying the function H to the master key MK and to the number Sp. In the following step E17', the server SRV transmits the number B to the processor HP. In the following step E18', the number B is retransmitted to the processor GP. In the following step E19', the processor GP receives the number B and in turn calculates the master key MK by raising the number B received to the power a modulo p. The processor GP also calculates the session key K0 by applying the function H to the key MK and to the number Sp. Thus, as above, the master key MK, the session key K0 and the number Sp are known only by the processor GP and the server SRV.

Figure 5:
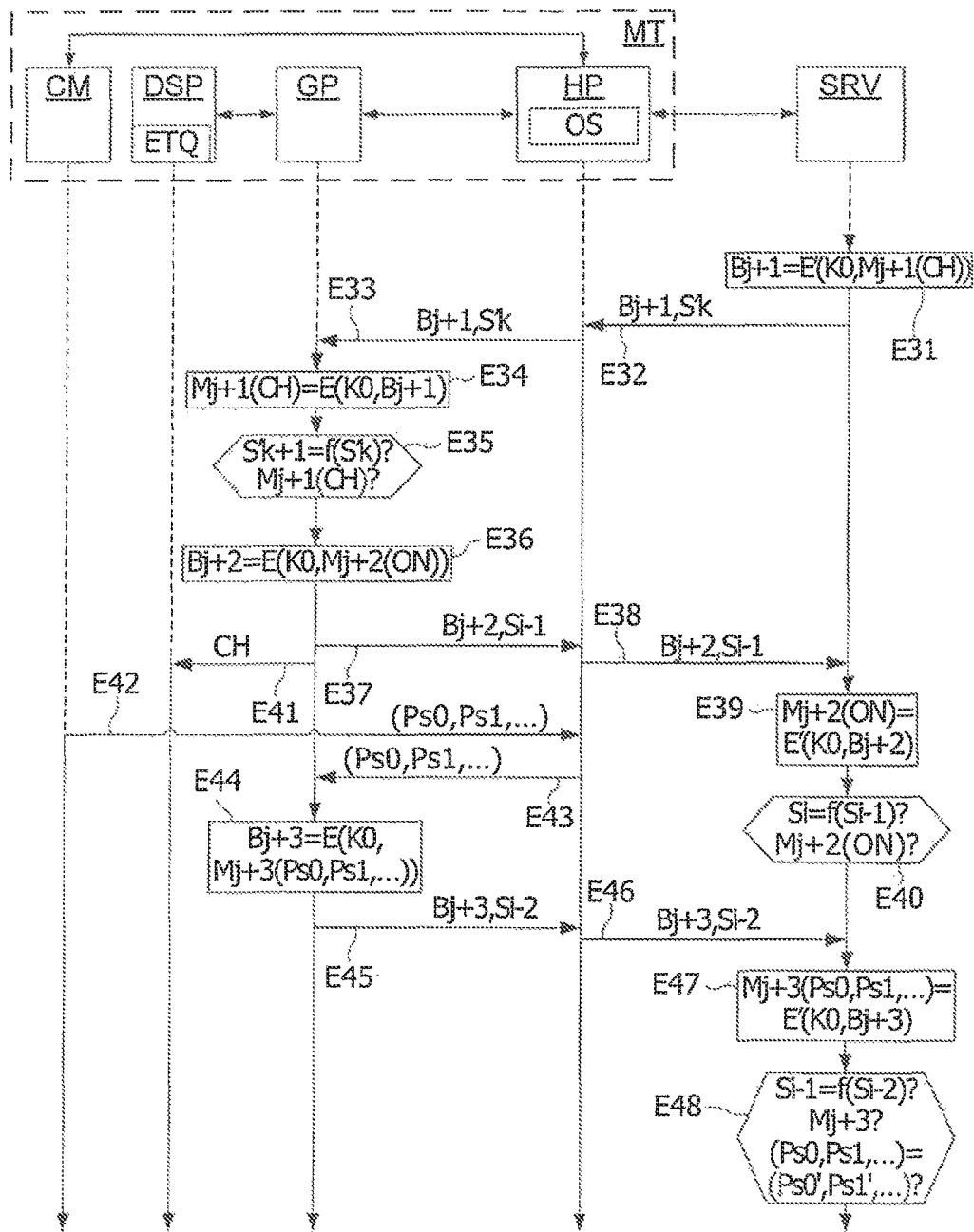

FIG. 5 shows a sequence of steps E31 to E48 executed during a transaction, following step E20 or E26 in FIG. 3, or step E19' in FIG. 4. In step E31, the server SRV generates the content of a message Mj+1 to be sent to the terminal MT, and encrypts the message Mj+1 using the function E' and the key K0. The data of the body of the message Mj+1 comprise data CH requesting secret information from the user of the terminal MT. The data CH may comprise an image or a sequence of images to be displayed on the screen DSP of the terminal MT. In step E32, the server SRV transmits the encrypted message Bj+1=E'(K0, Mj+1(CH)) to the terminal MT. In step E33, the processor HP receives the encrypted message Bj+1 and retransmits it to the processor GP.

In step E34, the processor GP receives the encrypted message Bj+1 and decrypts it to obtain the message Mj+1 (CH)=E(K0,Bj+1). In step E35, the processor GP verifies that the header data of the message Mj+1 are consistent with the header data of the message Mj received beforehand. If the header data of the message Mj+1 are consistent, the processor GP generates, in step E36, the content of a message Mj+2 to be sent to the server SRV. The data of the body of the message Mj+2 comprise a result ON of the verification carried out in step E35. The processor GP encrypts the message Mj+2 (ON) using the function E and the session key K0. In the following steps E37 and E41, the processor GP transmits the encrypted message Bj+2 E(K0, Mj+2(ON)) to the processor HP and displays the data CH on the screen DSP of the terminal MT. In step E38, the processor HP transmits the encrypted message Bj+2 received from the processor GP in step E37 to the server SRV. In step E39, the server SRV decrypts the received encrypted message Bj+2. In step E40, the server SRV verifies the header data of the message Mj+2 and especially the result ON of the verification contained in the decrypted message Mj+2. If the header data of the message Mj+2 are not consistent with the header data of the previous message Mj+1, or if the result ON of the verification reveals an error, the server SRV terminates the transaction. In parallel, after the data CH requesting the secret information have been displayed, the user is invited to enter a response using the interface means CM of the terminal MT. In step E42, the user enters a response that takes the form of input data Ps0, Ps1, . . . comprising, for example, a series of positions and/or movements and/or keystrokes input via the interfacing means CM. The data Ps0, Ps1, . . . are received by the processor HP and transmitted to the processor GP in step E43.

The following step E44 corresponds to step E36, but applies not to the result ON of the verification, but to the input data Ps0, Ps1, . . . . In this step, the processor GP generates a message Mj+3, comprising the input data Ps0, Ps1, . . . , to be sent to the server SRV, and encrypts the message Mj+3. In step E45, the processor GP transmits the encrypted message Bj+3=E(K0, Mj+3(Ps0, Ps1, . . . )) obtained to the processor HP. In step E46, the processor HP retransmits the encrypted message Bj+3 to the server SRV. In step E47, the server SRV receives and decrypts the encrypted message Bj+3, to obtain the contents of the message Mj+3. In step E48, the server SRV verifies the header data of the decrypted message Mj+3, and the input data Ps0, Ps1, . . . contained in the body of the message Mj+3. If these verifications fail, the server SRV terminates the transaction. On the contrary, if these verifications succeed the user is authenticated.

The processor HP may add, to all the messages transmitted to the server SRV in the sequence of steps in FIGS. 3 to 5, an identifier identifying the terminal such as an IP address, a MAC address, or even a telephone number or an IMEI number if the terminal is a cell phone. Thus, the server SRV can identify the origin of the received messages, and thus determine, in particular, the session key K0 to be used.

In one embodiment, provision is made in step E13 or E13' for the processor GP to apply the function PRN to a seed number SD3 in order to obtain a number S0 subsequently used as the first number in a series of sequence numbers. The processor GP then calculates p sequence numbers in succession by applying the hash function f to the first number S0, and then applying this function f to the result obtained, the latter operation being repeated a number of times. The number p of numbers thus calculated may be randomly chosen and has a value of about several hundred or several thousand. The p sequence numbers thus calculated are stored in a memory that is inaccessible from outside the processor GP. The sequence number Sp is transmitted with the encrypted master key EK in steps E14 and E15. Each message Mi exchanged between the processor GP and the server SRV is transmitted with a sequence number Si equal to or generated from the sequence number S0. In step E17, the message M0 is transmitted with the sequence number Sp−1 such that Sp=f(Sp−1). Thus, in step E21, the server SRV may verify that the sequence number Sp−1 received with the message M0 allows the sequence number Sp that it received in step E15 to be obtained. In step E22, the processor GP transmits the message Mj with a sequence number Si corresponding, in the series of sequence numbers S0 . . . Sp, to the sequence number preceding that (Si+1) that was transmitted to the server SRV with the last transmitted message (Bj−1). In step E26, the server SRV verifies the sequence number Si received by applying the function f to it and comparing the result obtained with the previous sequence number received Si+1: Si+1=f(Si).

Likewise, before step 31 the server SRV may also generate a series of sequence numbers S'k from a first sequence number S'0 randomly generated using the hash function f. The number of sequence numbers in the series is also randomly chosen. The sequence numbers S'k thus generated are transmitted in succession in the reverse order to that in which they were obtained, with each message emitted by the server SRV. During a transaction, the processor GP may thus ensure that each message received indeed comes from the server SRV by verifying that the result of applying the function f to the sequence number received is equal to the sequence number received beforehand.

On account of the one-way property of hash functions, it is impossible to calculate the inverse function of a hash function, i.e. to calculate the sequence number Si from the following sequence number Si+1 obtained by applying the hash function f to the number Si. Using sequence numbers Si in this way provides an additional level of security preventing malware running on the processor HP, which will have access to the session key K0, from computing the sequence number Si from the sequence number Si+1 transmitted beforehand, and therefore from hijacking the identity of the processor GP with respect to the server SRV, or the identity of the server SRV with respect to the processor GP. It will be noted that the transmitted sequence numbers Si may be inserted in the messages Mj and therefore transmitted in encrypted form with the messages Mj.

Sequence numbers Si that are modified and transmitted in this way in each message transmitted between the processor GP and the server SRV may also be used to generate a new session key from the master key MK and the current sequence number Si (Ki=H(MK,Si)) or S'k (Kk=H(Mk, S'k)). Thus, the terminal MT may execute a new transaction without the processor GP having to generate a new master key MK if the latter already has a master key MK stored in memory. The new transaction may then be executed directly from step E17 (FIG. 3) or after step E19' (FIG. 4). First the processor GP and the server SRV generate a new session key Kj=H(MK,Sj) from their shared master key MK and the last sequence number Sj that is known by both the server SRV and the processor GP. It will be noted that it may also be decided to change the session key during a transaction, the new session key being calculated from a current sequence number.

Figure 6:
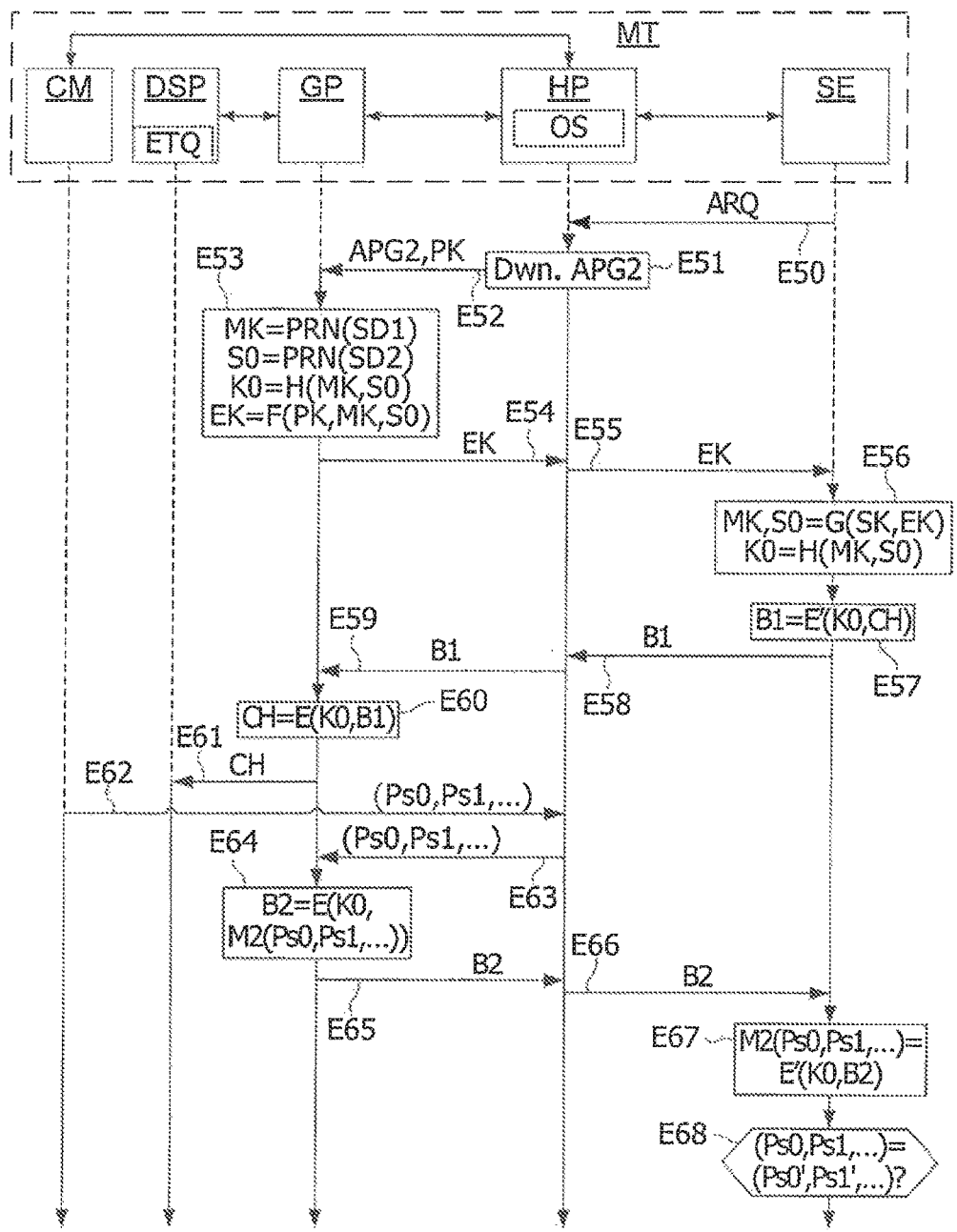
FIGS. 6 and 7 show sequences of steps executed by the terminal, in different embodiments.

In one embodiment, the processors HP, GP and SE of the terminal MT are configured to execute a procedure such as that shown in one of FIGS. 3 to 5. This procedure may be simplified as shown in FIG. 6. Thus, FIG. 6 shows a sequence of steps E50 to E68 allowing the processor SE to authenticate the user of the terminal MT without allowing the processor HP access to the secret code. In step E50, the processor SE emits an authentication request ARQ in order to authenticate the user. In the following step E51, the processor HP receives the request ARQ and loads a program APG2 into the memory HMEM of the processor HP. In the following step E52, the program APG2 is transferred from the memory HMEM to the memory GME of the processor GP. During this step, a public key PK is also transferred from the processor SE to the memory GMEM. The program APG2 comprises a random number generating function PRN, an asymmetric encryption function F, for example a 2048 bit RSA algorithm, a symmetric encryption function E, for example a 256 bit AES algorithm, and a hash function H, for example the SHA-1 function.

In the following step E53, the processor GP executes the program APG2, this involving operations for applying the random number generating function PRN to seed values SD1, SD2, in order to obtain numbers MK and S0. These numbers are stored in/confined to a memory area of the processor GP that is inaccessible from outside the latter. The number MK is subsequently used as a secret master key. A session key K0 is also calculated by applying a hash function H to the key MK and to the number S0. The processor GP also applies the asymmetric encryption function F, using the key PK that it received in step E12, to encrypt the key MK and the number S0. The encrypted data EK thus obtained is transmitted, in step E54, to the processor HP, then retransmitted by the processor HP to the processor SE in step E55. In step E56, the processor SE receives the encrypted data EK and decrypts it using a private key SK, known by it alone, corresponding to the public key PK. This decryption operation makes it possible for the processor SE to obtain the master key MK and the number S0. Since it knows the function H, the processor SE can then ascertain the session key K0 used by the processor GP by applying the function H to the key MK and to the number S0. The session key K0 is thus known only by the processor SE and the processor GP and may therefore be used by said processors to encrypt exchanged messages, and thus to secure these exchanges. The session key K0 is intended to be used only during the procedure in course of execution.

In the following step E57, the processor SE encrypts a request CH for secret information using the function E and the session key K0. The data CH may comprise an image or a sequence of images to be displayed on the screen DSP. In step E58, the processor SE transmits the data B1=E(K0, CH) to the processor HP. In step E59, the processor HP receives the encrypted data B1 and retransmits them to the processor GP. In step E60, the processor GP receives the encrypted data B1 and decrypts them to obtain the data CH. In step E61, the processor GP displays the data CH on the screen DSP of the terminal MT. The user is thus invited to enter a response using the interfacing means CM of the terminal MT. In the step E62, the user enters a response taking the form of a series of positions and/or movements and/or keystrokes Ps0, Ps1, . . . input via the interfacing means CM. These input data Ps0, Ps1, . . . are received by the processor HP and transmitted to the processor GP in step E63. In the following step E64, the processor GP receives the input data Ps0, Ps1, . . . and encrypts them using the function E and the key K0. In the following step E65, the processor GP transmits the encrypted data B2=E(K0, Ps0, Ps1, . . . ) obtained to the processor HP. In step E66, the processor HP retransmits the encrypted data B2 to the processor SE. In step E67, the processor SE receives and decrypts the data B2 in order to obtain the input data Ps0, Ps1, . . . . In step E68, the processor SE verifies the input data Ps0, Ps1, . . . . If this verification fails, the processor SE considers that the user authentication has failed. In contrast, if this verification succeeds, the processor SE considers that the user authentication has succeeded and may therefore allow the user to access services such as access to a cell phone network. It will be noted that each message transmitted between the processors GP and SE may be accompanied by a sequence number Si corresponding to a sequence number Si+1 transmitted beforehand such that Si+1=f(Si), f being a hash function such as the SHA-1 function.

Using the processor GP during the sequence of steps E50 to E58 allows transit of the secret code through the processor HP liable to be running a malicious program to be avoided. Specifically, in steps E50 to E58, the processor HP does not have access to the authentication request data, and may be unable to make sense of the input data Ps0, Ps1, . . . entered by the user if the authentication request data were defined on the basis of a random variable.

It will be noted that the sequence of steps E50 to E68 may be simplified by using the key MK directly as the encryption key in steps E57, E60, E65 and E67.

If the data CH requesting the secret information are transmitted in a way that makes them inaccessible to the processor HP, the input data Ps0, Ps1, . . . , does not need to be transmitted in encrypted form and may therefore be transmitted directly to the processor SE in step E59.

The processor GP may be configured to generate authentication data from input data Ps0, Ps1, . . . in step E44 or E64 (depending on the data CH). In this case the processor GP substitutes these authentication data in the message Mi+2 or B2 for the data Ps0, Ps1, . . . .

Figure 7:
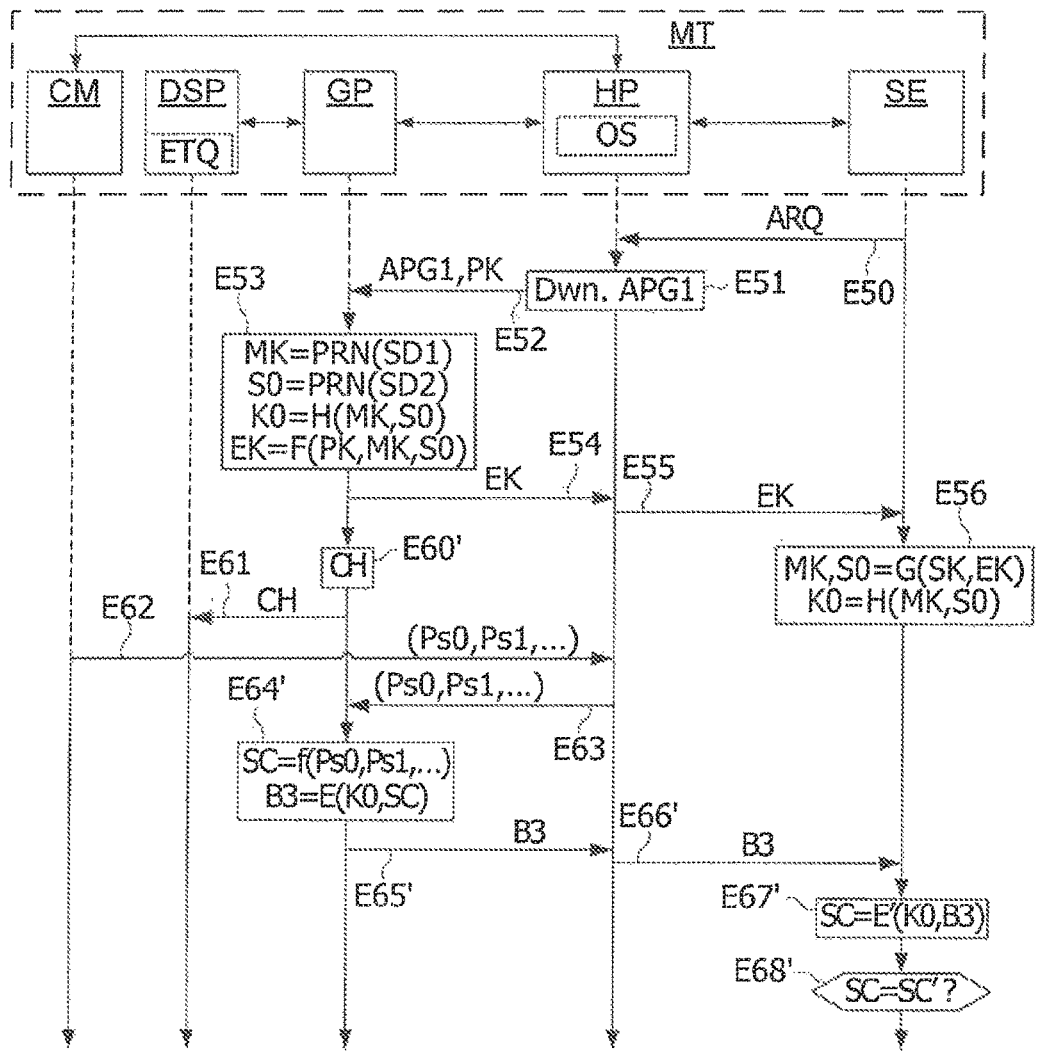

FIG. 7 shows a sequence of steps that differs from the sequence of steps in FIG. 5 in that the data CH requesting the secret information are generated directly by the processor GP. Thus, the sequence of steps in FIG. 7 differs from the sequence of steps in FIG. 6 in that steps E57 to E59 are removed, and steps E60 and E64 to E68 are replaced by steps E60' and E64' to E68'. In step E60', the processor GP generates the data CH. In step E64', the processor GP generates a secret code SC from input positions Ps0, Ps1, . . . and the data CH, and encrypts the code SC using the function E and the key K0. In steps E65 and E66, the encrypted data B3 obtained is transmitted to the processor SE via the processor HP. In steps E67' and E68' the processor SE decrypts the data B3 in order to obtain the secret code SC, and compares the code SC to an expected value SC'.

It will be noted that if the secure processor SE requires a new authentication, and if the processors GP and SE already have a shared master key MK stored in memory, the authentication may be carried out without generating a new master key. The new authentication may then be executed directly from step E57 (FIG. 6) or step E60' (FIG. 7). First, the processor GP and the processor SE generate a new session key K1=H(MK,S1) from the master key MK and a sequence number S1=f(S0) calculated from the sequence number S0 known by both the processor SE and the processor GP.

In the sequences of steps in FIGS. 5 to 7, it is important that neither the data CH nor the data Ps0, Ps1, . . . input by the user allow, by themselves, the data allowing user authentication by the server SRV or the processor SE to be generated, and that only knowledge of both the data CH and the data Ps0, Ps1, . . . or the authentication data corresponding to the data Ps0, Ps1, . . . enables user authentication.

In one embodiment, the input data Ps0, Ps1, . . . input by the user in step E42 comprise a single use activation code received via another transmission channel (i.e. SMS, web server, e-mail or post). This activation code may be a sequence of alphanumeric characters or a sequence of icons or images or a combination of these elements. In the case where this activation code is delivered by a web server over an Internet connection, this code may be a one- or two-dimensional optical code that can be input via the terminal MT if the latter is equipped with an image sensor. The authentication data Ps0, Ps1, . . . may also comprise a passport photo of the user or any other piece of biometric information such as a fingerprint if the terminal is equipped with a fingerprint reader. The data CH requesting the secret information displayed by the processor GP then simply forms an image displayed on the screen DSP inviting the user to enter the required identification data.

In one embodiment, the data CH form a sequence of images, and the processor GP is programmed so that the latter displays this sequence of images so that it cannot be captured by a malicious program running on the processor HP. Specifically, the server SRV or the processor SE and the processor GP may implement a protocol based on a visual cryptography algorithm. Such an algorithm is, for example, described in documents "Visual Cryptography", Moni Naor, Adi Shamir, Eurocrypt 94, and "Construction and Bounds for Visual Cryptography", G. Ateniese, C Blundo, A. De Santis, G. G. Stinson. This algorithm decomposes an original image, for example a humanly intelligible image, into a number of source images that are the same size as the original image, in a way such that the original image can be reconstructed only by superposing all the source images generated by the decomposition, and such that it is very difficult to reconstruct the original image if any one of the source images is missing.

In one embodiment, each image of the sequence of images to be displayed is decomposed into a number of source images that are displayed on the screen, by the processor GP, not simultaneously so as to be superposed but one after the other in succession. The retinal remanence of the user is exploited so that the latter can reconstruct each of the images in the sequence.

In one embodiment, the sequence of images comprises different images and is transmitted to the processor GP in the form of a sequence of n images, each image being decomposed into m source images. The processor GP groups the m source images of each image into a number of frames, for example into two or three frames, which it displays in succession on the screen. In the example where there are two frames per image in the sequence of images, the first of the two frames is, for example, obtained by adding x source images of the image, and the second frame is obtained by adding the m-x other source images of the image. The source images forming each frame may be randomly selected. The processor GP displays each frame thus generated for a time t. In order to exploit retinal remanence, the length of time F×t may be shorter than 15 ms, F being the number of frames displayed for each image of the sequence.

This approach makes it impossible for a malicious program running on the processor HP to reconstruct the images of the sequence via a screenshot. Provision may be made for the program executed by the processor GP to wipe a frame from the video memory VMEM when a following frame is displayed.

This method of displaying a sequence of images may be used, for example, to display a keypad the keys of which are arranged in a random order relative to one another. The displayed keypad allows the user to enter a secret code taking the form of a sequence of alphanumeric characters or icons. In this case, the images of the image sequence all contain a given keypad, but are decomposed in different ways into unintelligible frames that are displayed in succession by the processor GP. To obtain a higher level of security, provision may be made to regenerate the source images of the image of the keypad a number of times so that each source image only figures a limited number of times, for example once, in the frames displayed in succession. In order to limit the computational power required to decompose the image of the keypad into source images, provision may be made for the image of the keypad to be decomposed into an image containing only the shape of the keys of the keypad and an image containing only the characters of the keys of the keypad, only the image of the characters of the keys of the keypad being decomposed into source images that are unintelligible separately and grouped in various frames that are displayed in succession. The secret code may be input by means of a touch-sensitive screen superposed on the display screen or by means of a keypad, the displayed images then simply indicating the correspondence between the characters of the secret code to be introduced and the keys of the keypad.

In this way, even if a malicious program running on the processor HP is able to access the position of the regions or keys pressed by the user during the input of a secret code, it cannot, by taking a succession of screenshots, determine which alphanumeric characters correspond to the regions or keys pressed. This is because activation of the screenshot function is generally not rapid enough for all the frames of such a sequence of images to be captured, and the processor GP may be configured to display the frames at a rate higher than the rate at which the screenshot function can be activated, and to wipe frames after they have been displayed and replaced by a new frame on the display screen.

The data CH requesting the secret information may also comprise a three-dimensional object model, the processor GP displaying, at a given instant, a view of this object, and modifying the viewing angle of the object depending on commands entered by the user via the interfacing means CM. The movements of the relief object commanded in this way by the user allow the secret code entered by the user to be determined. For example, the displayed three-dimensional object may be a cube with numbered faces, the user being able to make the cube turn in order to expose the numbers of a secret code. The input data may then comprise the manipulation commands entered by the user and commands confirming selection of a cube face.

The input positions or the movements entered by the user are sent in encrypted form by the processor GP to the server SRV or to the processor SE via the processor HP (steps E45, E46, E65, E66). The server SRV (FIG. 5), (or the processor SE—FIG. 6—or even the processor GP—FIG. 7) that has the sequence of displayed images CH at its disposal may then determine what sequence of alphanumeric characters corresponds to the input positions or the movements entered by the user, and therefore the secret code thus input by the user. If the secret code input corresponds to an expected secret code, the server SRV, or the processor SE, may consider that the user authentication has succeeded.

In another embodiment, the data CH comprise an array of a number of images some of which are source image regions of an intelligible image, in the visual cryptography sense.

The source image regions belonging to the array of images CH complement a region of the image printed on a semi-transparent label ETQ issued to the user and to be placed on a region of the display screen of the terminal. Thus, each source image region, when it is superposed with the label ETQ, forms an image region intelligible to the user. The user is invited to place their label ETQ on a region of the screen where the images of the array of images may be displayed, and to move, using the interfacing means CM, the displayed images. When an intelligible image region can be seen on the screen DSP, meaning that the displayed image is a source image of the intelligible image, in the visual cryptography sense, the user is invited to enter a confirmation command. The movement and confirmation commands Ps0,Ps1, . . . input by the user allow those images selected by the user from the array of displayed images CH to be determined. If the images selected by the user in this way indeed correspond to source image regions of the intelligible image, the user may indeed be considered to possess a label on which the complementary image of the source image regions of the array of images CH is printed. If the label ETQ issued to the user is unique, user authentication may be considered to have succeeded. Of course, the label is made from a film that is thin enough not to prevent the touch-sensitive part of the touch-sensitive surface on the display screen from being used when covered with the label.

The intelligible image may be a black-and-white or color photograph, or a sequence of alphanumeric characters. Each source image part may cause, in combination with the image printed on the label ETQ of the user, one or more alphanumeric characters to appear.

In another embodiment, the intelligible image may comprise a number of pictograms each corresponding to a display comprising a number of segments all the segments of which are "displayed". Thus each pictogram may be the character "8" in the case of a seven-segment display. The image printed on the label ETQ issued to the user is a source image of this intelligible image comprising a number of these pictograms. Moreover, the array of images CH displayed by the processor GP comprises one or more images that cause certain of the segments of the pictograms of the intelligible image to appear. The user is invited to place their label ETQ over a region of the screen where each image of the array of images CH may be displayed, and to enter, by means of the keypad CM of the terminal, the characters that they see appear depending on the segments that appear on the screen through their label ETQ. If the characters entered by the user correspond to those expected on account of the array of images CH, it means that the user indeed possesses the label ETQ that complements the displayed source images. It will be noted that the characters entered by the user correspond to a single-use secret code, it being understood that an array of images CH to be displayed may cause, in combination with a single label, any sequence of characters to appear, depending on the chosen presentation method, analogously to a segmented display (for example a 7-segment display).

The server SRV, or the processor SE, can thus authenticate the user if the latter alone has at their disposal a label ETQ on which the complementary source image figures. The code entered by the user may be a single-use code, so that even if a malware program running on the processor HP intercepts this code, it cannot be subsequently used to obtain authentication fraudulently in absence of the user. The source image or the source image parts CH may be generated by the server SRV or processor SE on the basis of the image figuring on the label ETQ issued to the user.

In one embodiment, the data CH comprise an audio source sequence, and a protocol based on an audio cryptography algorithm (similar to a visual cryptography algorithm) is implemented. Such an algorithm is for example described in the document "Simple Audio Cryptography" by Yusuf Adriansyah. This algorithm consists in decomposing an original audio sequence into a number of source audio sequences of the same length as the original audio sequence, in a way such that the original audio sequence can be reconstructed only by simultaneously playing all the source audio sequences generated by the decomposition, and such that it is very difficult to reconstruct the original audio sequence if any one of the source audio sequence is missing. Provision may be made to play two source audio sequences simultaneously, one via the terminal MT and the other via a portable device having a memory allowing a source audio sequence to be stored and a headphone allowing the stored source audio sequence to be played without a microphone of the terminal hearing it. If the user hears an intelligible audio message by playing the two source audio sequences simultaneously, it means that the source audio sequence played by the portable device complements the source audio sequence in the data CH transmitted by the server SRV or the processor SE.

The master key MK may also be generated without using an asymmetric encryption algorithm, which generally requires more powerful computational means than symmetric encryption algorithms. Specifically, the sequence of steps E70 to E79 shown in FIG. 8 may be carried out. In step E70, data requesting secret information CH are generated by the processor GP in order to allow the user to enter a secret code. The data CH are displayed on the screen DSP in step E71. As described above, the data CH may comprise a sequence of images that are intelligible to a user, each intelligible image being decomposed into a number of source images, in the visual cryptography sense, each source image being unintelligible to a user. Each intelligible image may show a keypad the keys of which are distributed in a random order. In step E72, a secret code is input by the user using the interface means CM. The secret code SC is known to the server SRV or the processor SE and allows the user to be authenticated. In step E73, the commands Ps0, Ps1, . . . , entered by the user are transmitted via the processor HP to the processor GP. In step E74, the processor GP determines the secret code SC entered by the user depending on the commands Ps0, Ps1, . . . entered by the user and depending on the content of the intelligible images displayed in step E71. In step E74, the processor applies a hash function H, for example the SHA-1 function, to the secret code SC in order to obtain a derived code HSC. In steps E75, E76, the derived code HSC is transmitted to the server SRV or to the processor SE via the processor HP. In step E77, a derived code HSC' is calculated by applying the hash function H to a secret code SC' stored in memory beforehand in association with information identifying the user. In step E78, the server SRV or the processor SE compares the received derived code HSC with the calculated derived code HSC'. If these two derived codes are identical, the server SRV or the processor SE considers that the user authentication has succeeded and executes step E79 in which it calculates a secret key SK0 as a function of the secret code SC. In step E80, the processor GP also calculates the key SK0 by applying the same function to the secret code SC. The processor GP or the server SRV (or the processor SE) may then generate a master key MK that it encrypts, using the key SK0, and transmits to the other. The key MK may be randomly generated. In step E78, if the derived codes HSC and HSC' are different, the server SRV or the processor SE may transmit a verification report message to the processor GP via the processor HP. If the verification fails, the processor GP terminates the procedure, if not, the processor GP executes step E80. The key SK0 may, for example, be generated by applying a hash function FF to the secret code SC shared in this way by the processor GP and the server SRV or the processor SE. The key SK0 or the master key MK may also be generated using the algorithm described in the document "Simpler Session-Key Generation from Short Random Passwords", Minh-Huyen Nguyen, Safi Vadhan, Nov. 10, 2006.

Figure 8:
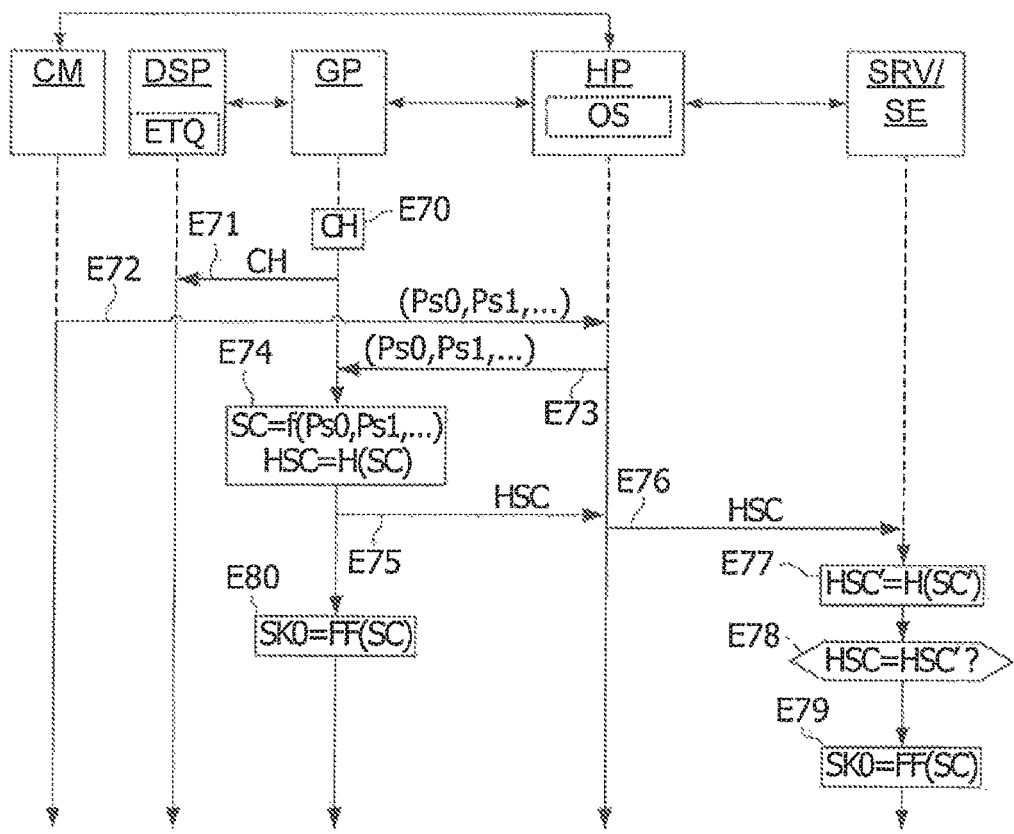
FIGS. 8 and 9 show sequences of steps executed by the terminal and one or more remote servers, in different embodiments.

It will be noted that the sequence of steps shown in FIG. 8 may also be implemented using a semitransparent label to be placed on the display screen DSP, such as described above. In this case, the data CH are transmitted beforehand unencrypted to the processor GP. In step E78, the server SRV or the processor SE verifies that the data Ps0, Ps1, . . . input by the user correspond to the data expected on account of the label ETQ that the user has at their disposal, the configuration of the label ETQ being known only by the server SRV or the processor SE.

Figure 9:
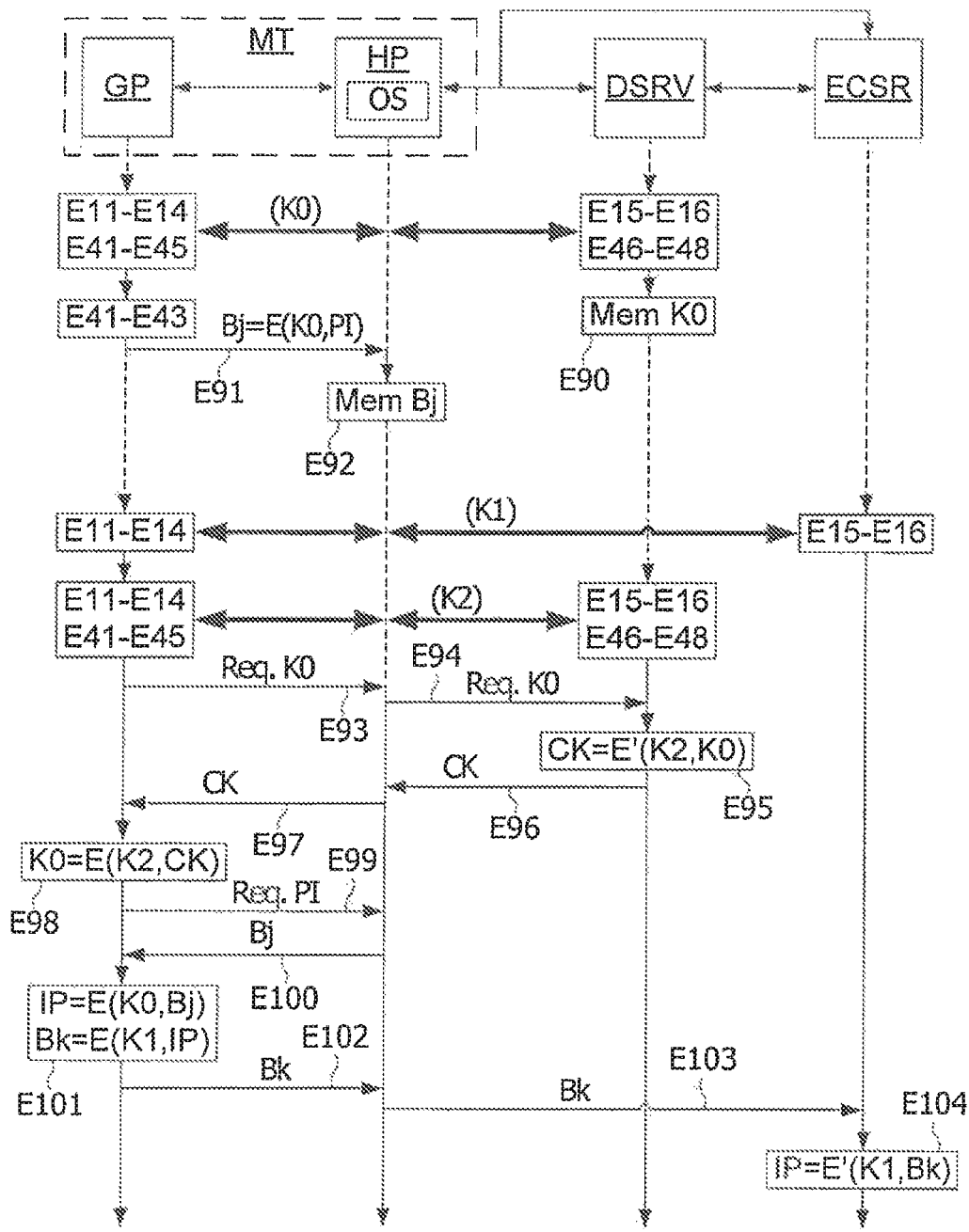

In one embodiment, the method for establishing a secure link between the processor GP and a server may be used to keep payment information secure, and to use this payment information in a payment transaction executed with an e-commerce server. FIG. 9 shows a sequence of steps that may be executed in order to keep payment information secure and transmit payment information to an e-commerce server. In FIG. 9, the program APG loaded into the processor GP may be configured to generate a common session key K0 shared with a dedicated server DSRV, in accordance with steps E11 to E16 or E11' to E19', and then to authenticate the user in accordance with steps E41 to E48. The payment information PI may then be entered by the user, for example by modifying steps E41 to E43 or E61 to E63 for this purpose, in a way such that they are not directly accessible by the processor HP, even if this information is entered by way of the interfacing means CM. The payment information may be the information relating to a payment card or bank card (bank statement) that is normally input in order to carry out an on-line transfer or payment. Provision may also be made for the information PI to be entered in the form of a photograph of a payment card or of a bank statement, which may be taken by the terminal MT if the latter is equipped with a camera. A printed text recognition function may then be used to read the information contained in the photograph of the payment card. The information PI thus input is encrypted using the session key K0 and transmitted in encrypted form to the processor HP (step 91) that stores it in memory (step E92). For its part, the dedicated server stores the session key K0 in memory, and uses it as a key for decrypting payment information sent by the previously authenticated user (step E90). The session key is therefore stored in memory in association with information allowing the user to be identified.

During a payment transaction with an e-commerce server ECSR, the processor GP generates a session key K1 and shares it with the server ECSR by executing steps E11 to E16 or E11' to E19' with the latter. The processor GP also executes, with the dedicated server DSRV, steps (E11 to E16 or E11' to E19') for generating a common session key K2, and steps (E41 to E48) for authenticating the user. The processor GP then transmits a key request to the server DSRV in order to allow it to decrypt the payment information stored in the terminal MT (steps E93, E94). In response, the server DSRV transmits (steps E95, E96, E97) the key K0 encrypted using the session key K2 (E(K2, K0)) to the processor GP. In step E98, the processor GP decrypts the key K0 using the session key K2. The processor GP then asks the processor HP for the encrypted payment information (step E99). The processor GP receives this information in step E100, decrypts it with the key K0 obtained from the server DSRV, and encrypts it with the session key K1 in step E101. Next, the processor GP transmits the encrypted payment information Bk to the server ECSR (steps E102, E103). In step E104, the server ECSR decrypts the payment information IP. The e-commerce server ESCR may thus validate a payment transaction initiated beforehand, for example during the generation of the session key K1. The payment information may be stored in a standard format, for example in the ECML format (defined by RFC document 4112). If the server ECSR is incompatible with this format, a gateway server may be used to receive the ECML-formatted payment information emitted by the processor GP, and to retransmit it in a format specific to the server ECSR. Of course, as described above, each message transmitted between the processor GP and the servers DSRV and ECSR may be accompanied by a sequence number Si, verification taking place on reception using the sequence number Si+1 received beforehand.

In the sequence of steps E90 to E104, the payment information is never accessible from outside of the processor GP and the server ECSR. It will be noted that the secure processor SE of the terminal may also play the role of the dedicated server DSRV in order to store an encryption key and transmit it securely to the processor GP.

The program APG, APG1, APG2 transmitted by the processor HP to the processor GP and executed by the latter may be secured against replacement by a malicious program, for example by calculating a signature for the memory or memories of the processor GP into which the program is loaded, the calculated signature being modified by a secret code input by the user and known by the server SRV or the processor SE. The signature thus modified is transmitted by the processor GP to the server SRV or to the processor SE, which has a table of expected values for the program signature stored in memory, the expected value depending on the type of terminal MT. Since the secret code and the expected signature value are known, the server SRV or the processor SE can calculate an expected modified value and compare it with that received from the processor GP and thus verify that the program loaded into the memory of the processor GP is not a malicious program.

Figure 10:
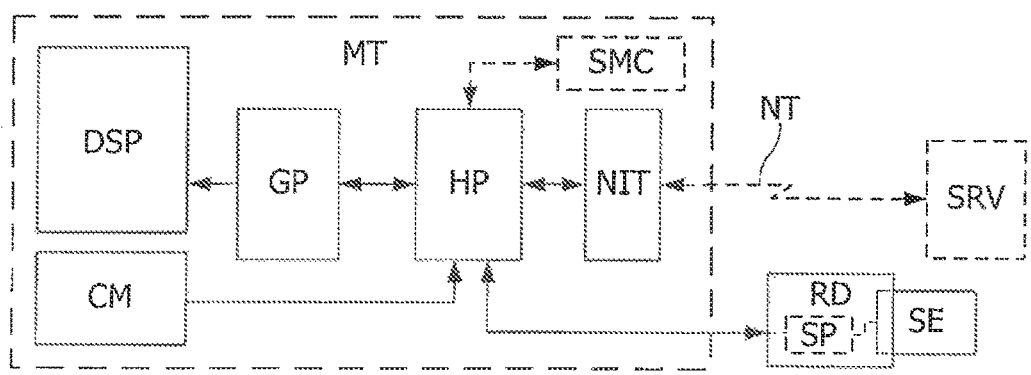
FIG. 10 schematically shows a conventional terminal connected to a secure processor in a card reader.

It will be clearly apparent to those skilled in the art that the present invention has many possible variant embodiments and many applications. In particular, the processor SE is not necessarily integrated into the terminal MT but may be integrated into a smartcard and connected to the processor HP by way of a card reader connected to a port of the terminal MT. Thus, FIG. 10 shows a card reader RD in which the processor SE, integrated into a card, is inserted. The terminal MT may comprise a smartcard SMC such as a SIM card. Of course, the reader RD may not be required if the processor SE is associated with connection means or transmission means making it possible for it to establish a link with the terminal MT (USB, Bluetooth, audio port link).

In another embodiment, the card reader RD may comprise a secure processor SP for managing communications between the processor SE and the processor HP, and in particular allowing a secure link to be established with the processor GP. The secure processor SP may also generate and transmit request data CH (step E31). The secure processor SP may also execute steps E39, E40, E47 and E48, the processor SE verifying the input data Ps0, Ps1, . . . provided by the user. If a label such as the label ETQ is used, the image that it contains may be known only by the processor SP.

Moreover, the invention is not limited to the sequences of steps described above, but also covers combinations of these sequences of steps. Thus, in the sequences shown in FIGS. 5 to 9, certain of the steps executed by the server SRV, DSRV may be executed by the processor SE or SP. Conversely, certain of the steps executed by the processor SE may be executed by the server SRV or DSRV.

The invention claimed is:

1. A method comprising:
  transmitting a program from a non-secure processor to a graphics processor associated with the non-secure processor;
  executing the program by the graphics processor, which execution comprises:
    establishing a link between the graphics processor and a secure processor entitled to authenticate a user;
    receiving a first image frame via the link, the first image frame being generated by decomposing an image intelligible to a user into complementary images frame comprising the first image frame and a second image frame, the first and second image frames being individually not intelligible to the user; and
    displaying the first image frame on a display screen coupled to the graphics processor, the image appearing to the user only when a semi-transparent support displaying the second image frame is positioned on the display screen so that the first and second image frames are superimposed;
  collecting by the non-secure processor first data from commands entered by the user by means of an input interface coupled to the non-secure processor; and
  transmitting the first data by the non-secure processor to the secure processor, the user being authenticated only when a relation exists between the first data and the image.

2. The method as claimed in claim 1, wherein the semi-transparent support is a label on which the second image frame is printed.

3. The method as claimed in claim 1, wherein the semi-transparent support is a semi-transparent display device comprising a semi-transparent display and communication circuits, the method further comprising transmitting the second image frame from the secure processor to the transparent display device.

4. The method as claimed in claim 1, wherein the execution of the program by the graphics processor further comprises:
  receiving a public key of the secure processor from the non-secure processor;
  generating a secret key;
  encrypting the secret key using the public key;
  storing the secret key in the volatile memory; and
  transmitting the encrypted secret key to the non-secure processor, the encrypted secret key being further transmitted from the non-secure processor to the secure processor.

5. The method as claimed in claim 4, in which the first image frame is received by the graphics processor in an encrypted form using the secret key and decrypted by the graphics processor.

6. The method as claimed in claim 1, in which the secure processor is integrated into a card in a terminal comprising the non-secure processor, or into a remote server connected to the terminal via a data transmission network.

7. The method as claimed in claim 1, further comprising determining a secret code from the image and the first data, and authenticating the user on the basis of the secret code.

8. The method as claimed in claim 7, wherein the secret code is used by the graphics processor and the secure processor to generate a secret key shared only by the graphics processor and the secure processor.

9. The method as claimed in claim 1, further comprising:
receiving a current message transmitted via a secure link established between the graphics processor and the secure processor, and including a current sequence number belonging to a series of sequence numbers comprising a first sequence number, and subsequent sequence numbers each being obtained by applying a hash function to a preceding sequence number in the series of sequence numbers; and
authenticating the current message by comparing a result of the hash function applied to the current sequence number with a previous sequence number received in a previously received message.

10. The method as claimed in claim 1, further comprising, during a payment transaction:
establishing a secure link between the graphics processor and an e-commerce server, and a secure link between the graphics processor and the secure processor;
collecting payment data of the payment transaction and encrypting the payment data using an encryption key shared by the graphics processor and the secure processor;
storing the encrypted payment data in the non-secure processor;
transmitting the encrypted payment data to the graphics processor;
decrypting the payment data by the graphics processor; and
transmitting the payment data by the graphics processor via the secure link to the e-commerce server.

11. The method as claimed in claim 10, wherein the collection of the payment data comprises:
taking a photograph of a payment card and extracting the payment data from the photograph, or else
presenting the image to the user by the graphics processor, collecting by the non-secure processor data relating to the image from commands entered by the user by means of the input interface;
transmitting the collected data to the secure processor; and
converting, by the secure processor, the collected data into payment data using the image.

12. The method as claimed in claim 10, wherein the payment data are in a standard format that is comprehensible to the e-commerce server or are transmitted to a gateway server that transmits the payment data to the e-commerce server in a format expected by the latter.

13. The method as claimed in claim 1, wherein the program is stored in a volatile memory that is not readable from outside the graphics processor.

14. The method as claimed in claim 1, wherein the graphics processor receives a plurality of first image frames which are displayed in succession on the display screen so that the image appears on the display screen in a manner that is intelligible to the user when the second image frame is superimposed onto the displayed first image frame.

15. A terminal comprising a non-secure processor associated with a graphics processor that controls a display screen, the non-secure processor being configured to:
transmit a program to the graphics processor, the graphics processor being configured when executing the program to:
establish a link with a secure processor entitled to authenticate a user;
receive a first image frame generated by decomposing an image intelligible to a user into complementary images frame comprising the first image frame and a second image frame, the first and second image frames being individually not intelligible to the user; and
display the first image frame on the display screen, the image appearing to the user only when a semi-transparent support displaying the second image frame is positioned on the display screen so that the first and second image frames are superimposed;
collect first data from commands entered by the user by means of an input interface coupled to the non-secure processor; and
transmit the first data to the secure processor, the user being authenticated only when a relation exists between the first data and the image.

16. The terminal as claimed in claim 15, wherein the semi-transparent support is a label on which the second image frame is printed.

17. The terminal as claimed in claim 15, wherein the semi-transparent support is a semi-transparent display device comprising a semi-transparent display and communication circuits, the method further comprising transmitting the second image frame from the secure processor to the transparent display device.

18. The terminal as claimed in claim 15, wherein the execution of the program further configures the graphics processor to:
receive a public key of the secure processor;
generate a secret key;
encrypt the secret key using the public key;
store the secret key in a volatile memory; and
transmit the encrypted secret key to the non-secure processor, the encrypted secret key being further transmitted from the non-secure processor to the secure processor.

19. The terminal as claimed in claim 18, wherein the execution of the program further configures the graphics processor to receive the first image frame in an encrypted form and to decrypt the first image using the secret key.

20. The terminal as claimed in claim 15, coupled to a card including the secure processor.

21. The terminal as claimed in claim 15, wherein the execution of the program further configures the graphics processor to:
receive a current message transmitted via a secure link established between the graphics processor and the secure processor, and including a current sequence number belonging to a series of sequence numbers comprising a first sequence number, and subsequent sequence numbers each being obtained by applying a hash function to a preceding sequence number in the series of sequence numbers; and
authenticate the current message by comparing a result of the hash function applied to the current sequence number with a previous sequence number received in a previously received message.

22. The terminal as claimed in claim 15, configured during a payment transaction to:
- establish a secure link with an e-commerce server, and a secure link between the graphics processor and the secure processor;
- collect payment data of the payment transaction and encrypt the payment data using an encryption key shared by the graphics processor and the secure processor;
- store the encrypted payment data in the non-secure processor;
- receive the encrypted payment data by the graphics processor, and decrypt the payment data; and
- transmit the payment data via the secure link from the graphics processor to the e-commerce server.

23. The terminal as claimed in claim 22, wherein the collection of the payment data comprises:
- taking a photograph of a payment card and extracting the payment data from the photograph, or else
- presenting the image to the user by the graphics processor, collecting by the non-secure processor data relating to the image from commands entered by the user by means of the input interface;
- transmitting the collected data to the secure processor; and
- converting, by the secure processor, the collected data into payment data using the image.

24. The terminal as claimed in claim 23, wherein the payment data are in a standard format that is comprehensible to the e-commerce server, or are transmitted to a gateway server that transmits the payment data to the e-commerce server in a format expected by the latter.

25. The terminal as claimed in claim 15, wherein the graphics processor comprises a volatile memory that is not readable from outside the graphics processor, the program being stored in the volatile memory.

26. The terminal as claimed in claim 15, wherein the graphics processor is configured to receive a plurality of first image frames which are displayed in succession on the display screen so that the image appears on the display screen in a manner that is intelligible to the user when the second image frame is superimposed onto the displayed first image frame.

* * * * *